(12) United States Patent
Strohbehn

(10) Patent No.: US 6,965,396 B1
(45) Date of Patent: Nov. 15, 2005

(54) VIDEO-CENTROID INTEGRATED CIRCUIT

(75) Inventor: Kim Strohbehn, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/562,296

(22) Filed: May 1, 2000

Related U.S. Application Data

(63) Continuation-in-part of application No. 08/671,225, filed on Jun. 27, 1996, now Pat. No. 6,058,223.

(60) Provisional application No. 60/000,575, filed on Jun. 28, 1995.

(51) Int. Cl.[7] .......................... H04N 5/225; G06K 9/36
(52) U.S. Cl. ...................... 348/171; 348/172; 382/288
(58) Field of Search ................ 348/171, 172, 348/169–170, 208.14, 294; 382/103, 288, 382/291, 312

(56) References Cited

U.S. PATENT DOCUMENTS

| | | | | |
|---|---|---|---|---|
| 3,988,534 A | * | 10/1976 | Sacks | 348/171 |
| H615 H | * | 4/1989 | Feinleib et al. | 356/121 |
| 4,849,906 A | * | 7/1989 | Chodos et al. | 348/171 |
| 4,872,051 A | * | 10/1989 | Dye | 348/113 |
| 4,959,714 A | * | 9/1990 | Lo et al. | 348/172 |
| 5,055,926 A | * | 10/1991 | Christensen et al. | 348/172 |
| 5,144,422 A | * | 9/1992 | Baker et al. | 348/116 |
| 5,187,777 A | * | 2/1993 | Conboy et al. | 345/502 |
| 5,220,398 A | * | 6/1993 | Horn et al. | 356/141.5 |
| 5,440,079 A | * | 8/1995 | Mathur et al. | 178/18.05 |
| 5,699,278 A | * | 12/1997 | Brajovic | 702/187 |
| 6,058,223 A | * | 5/2000 | Strohbehn | 382/312 |

OTHER PUBLICATIONS

Misha A. Mahowald and Carver Mead, The Silicon Retina May 1991, pp. 76-82.*

* cited by examiner

*Primary Examiner*—Wendy R. Garber
*Assistant Examiner*—Kelly Jerabek
(74) *Attorney, Agent, or Firm*—Francis A. Cooch

(57) ABSTRACT

An analog, single integrated circuit for providing centered video images. A light detector array which can be, e.g., a CCD or an array of phototransistors or silicon retinas, is scanned out to provide a video signal. Current summing lines along each row and column of the array are used as inputs to x and y position sensitive (computation) circuitry located on the edge of the pixel array. When the array utilizes silicon retinas, an absolute value circuit is added to restore low frequency information removed by the retinas to the current summing output. An on-chip sequencer uses the x and y position outputs to scan out the video image centered to the nearest pixel.

11 Claims, 11 Drawing Sheets

Photodetector
(bipolar p-n-p device)

VIDEO-CENTROID INTEGRATED CIRCUIT

CROSS-REFERENCE TO RELATED APPLICATIONS

This is a continuation-in-part of prior filed application Ser. No. 08/671,225, filed Jun. 27, 1996, issued as U.S. Pat. No. 6,058,223, on May 2, 2000, which claims the benefit of prior filed U.S. provisional application Ser. No. 60/000,575, filed Jun. 28, 1995.

STATEMENT OF GOVERNMENTAL INTEREST

This invention was made with Government support under Contract No. N00039-94-C-0001 awarded by the Department of the Navy. The Government has certain rights in the invention.

BACKGROUND OF THE INVENTION

The disclosed invention, called a video-centroid (VC) chip, relates to integrated circuits and, more specifically, comprises a mixed signal (has both analog and digital components), single integrated circuit that provides centered video images.

The centroid of an image is a very useful, well known quantity for image-tracking applications. However, present devices are digital and can provide a centered image only through the use of several integrated circuits.

Since finding the centroid is an averaging process, the solution is robust to noise as well as insensitive to minor variations in the apparent image due to changes in illumination level (but not gradient). In addition, centroid computation is consistent with a retina paradigm, i.e., it uses many simple, local computing elements in parallel to calculate a global quantity. Thus, computing the centroid of an image is a good candidate for an analog very large scale integrated (VLSI) implementation.

The earliest work on analog VLSI centroid-computing chips was reported in Deweerth, S. P., "Analog VLSI Circuits for Stimulus Localization and Centroid Computation", Int. J. Comput. Vision 8(3), 191–202 (1992). The core element for a simple centroid computation is an array of transconductance amplifiers, each of which is biased by a photodetector and generates an output current that is a function of the difference of two input voltages.

FIG. 1a is a schematic of a simple centroid-computing circuit consisting of one transconductance amplifier. As shown in FIG. 1b, the gate of one MOSFET of the input differential pair is connected to the output line (a follower), while the gate of the other is connected to a resistive divider. Applying known voltages V+ and V− on either end of the divider produces an output that varies linearly along its length and thus can be used to encode position. The left MOSFET, L, can be considered as encoding a position coordinate, while the right MOSFET, R, encodes the output position.

To perform the actual centroid computation, multiple transconductance amplifiers are configured as followers with a common position output node as shown in the schematic of FIG. 1b. The network of FIG. 1b attempts to satisfy the following equation:

$$0 = \sum_i I_{photo}(i) \tanh\left[\frac{V(i) - V_{out}}{2U_{th}}\right],$$

where V(i) is the position voltage at the noninverting (+) input of the ith amplifier, $I_{photo}(i)$ is the corresponding ith photocurrent, and $U_{th}$ is the thermal voltage divided by κ. The slope of the tanh function is the transconductance of the amplifier. For small signals, tanh can be replaced by the transconductance, which is linear with the bias current (i.e., photocurrent) in the subthreshold region.

If Kirchoff's current law (conservation of charge) is applied at the output node, it is readily apparent that the solution to Eq. 1 is the centroid of the photocurrent distribution. The network stabilizes at a point where the output $V_{out}$ is equal to the solution of Eq. 1, which is the image centroid for small signals or the weighted median for large signals. Both the centroid and the median yield excellent position estimates for images with a well-defined centroid.

Thus, a mixed signal (containing analog as well as digital components), signal integrated circuit would be desirable for computing the centroid of an image for use in image-tracking applications.

SUMMARY OF THE INVENTION

As shown in FIG. 2, the components of one embodiment of the invention include a photodetector array 10 comprising, for example, a phototransistor array, CCD, photodiodes or retina, with current summing lines along each row 13 and column 17. The array 10 is scanned out using scanners 12, 14 to provide a video signal. Additional elements include x and y position sensitive (computation) circuitry 16, 18, such as shown in FIG. 1, located on the edge of the pixel array. An on-chip sequencer 20 uses the x and y position outputs to scan out the video image centered to the nearest pixel.

BRIEF DESCRIPTION OF DRAWINGS

FIG. 10, comprising

DETAILED DESCRIPTION

Figure 1A:
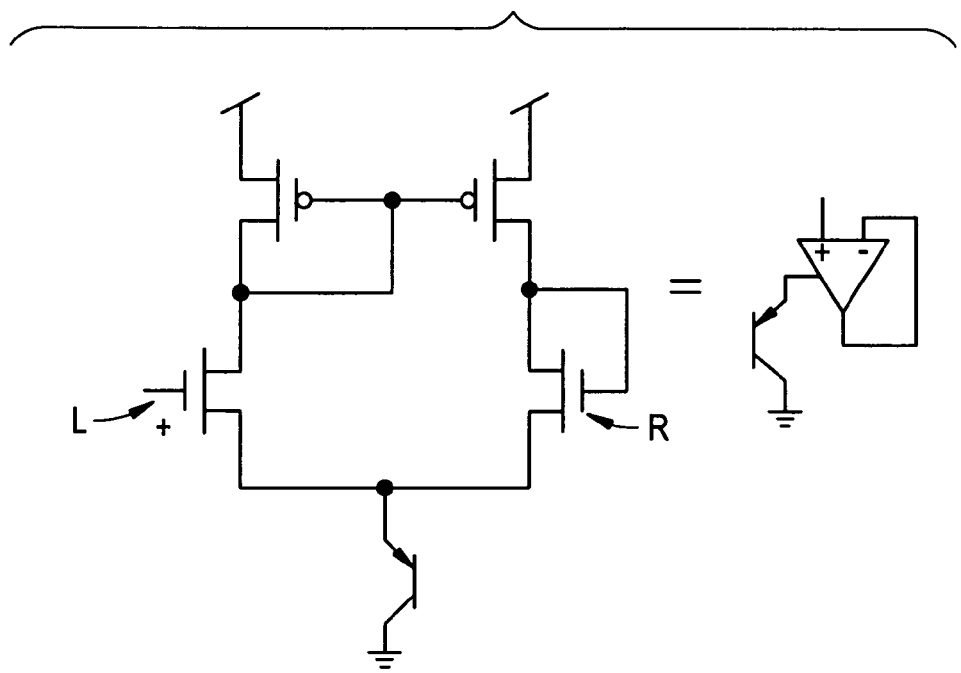
FIG. 1, consisting of FIGS. 1a and 1b, are schematics of, respectively, a simple centroid-computing circuit and a centroid computation network for implementation in an integrated circuit.
Figure 1B:
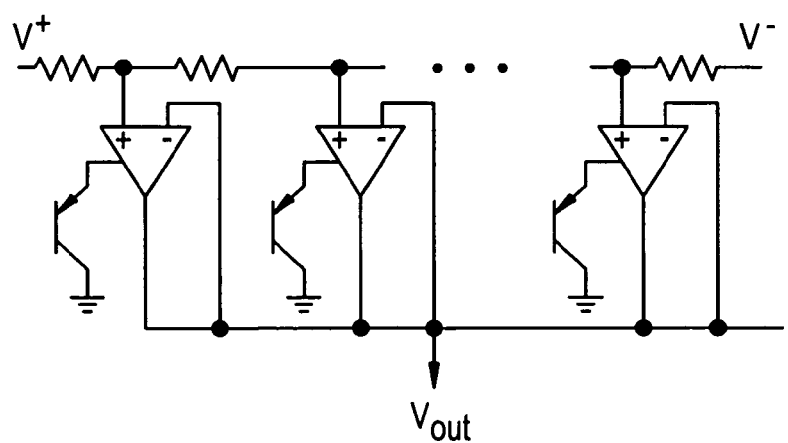
Figure 2:
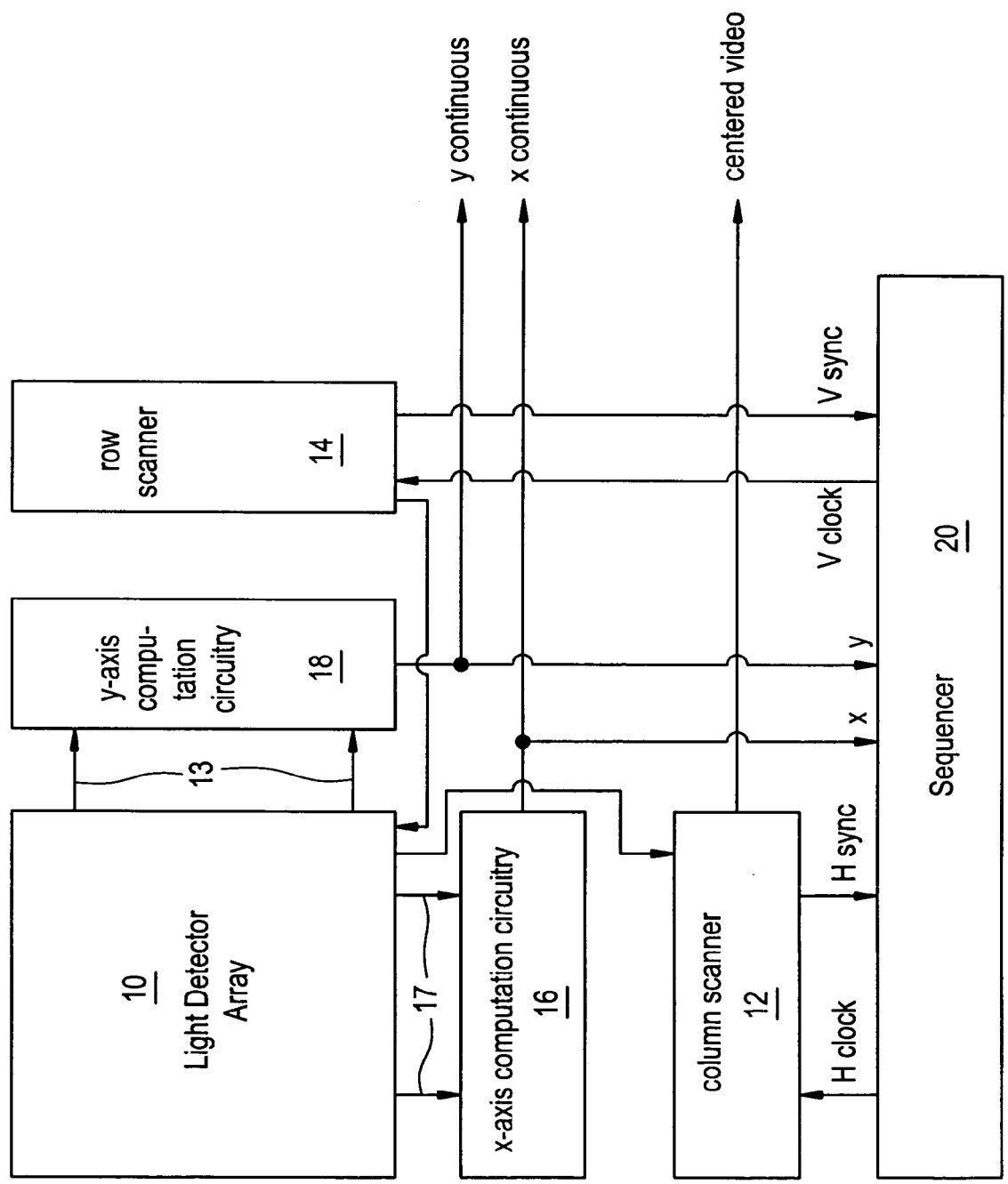
FIG. 2 is a block diagram of one embodiment of the invention.

To create the centroid-computing, single integrated circuit of the invention, the linear architecture of FIG. 1b was modified as shown in FIG. 2 to establish a two-dimensional light detector, e.g., photodetector, array 10 comprising a plurality of detector cells or pixels. Note, the term "photodetector array" is intended to include any light sensitive detector, including but not limited to charge injection devices and the other types of detectors discussed herein.

The array 10 is scanned using scanning means, e.g., scanners 12, 14, to read out the photocurrent at each detector cell or pixel, i.e., to provide a video signal. Summing means, e.g., current summing lines 13, 17, along, respectively, each row and column are used as the inputs to means for computing a centroid, e.g., respectively, the y-axis and x-axis centroid computation circuitry 16, 18, located on the edge of the pixel array. A sequencing means, e.g. an on-chip sequencer 20, uses the x and y position outputs to scan out the video image centered to the nearest pixel.

As noted, the invention output is both a video image and the centroid of that image. The additional video circuitry in the array 10 allows the same image to be viewed as the chip and thus ensures that the system is tracking the intended target. Note that incorporation of a small amount of circuit complexity, e.g., additional video transistors in each pixel of the array 10, helps reduce complexity in other parts of the system, for example, by eliminating the need for additional beam-slitters and methods of aligning the viewing and tracking optical components.

The summing operation allows each pixel to contribute to both the x and y centroids, in contrast to Deweerth's design in which alternating x and y pixels were used. In addition, summation is an averaging process, which helps to eliminate errors in the centroid caused by unusually conductive MOSFETs. Mismatch in transistor currents for identical drain, gate, and source voltages is unavoidable and must be accounted for in the design. The invention solves the mismatch problem by aggregation (i.e., averaging) in the same way as nature, which has to deal with nonuniformities in neuron properties that are far greater than those in MOSFETs. Aggregating the response of many parallel elements is a common technique in biological computation to improve the robustness of the output signal.

The invention has been used to generate image-position error signals for an image-motion stabilization system at the National Solar Observatory in Sunspot, N.M. It has successfully replaced a half-height rack of digital processing equipment formerly used for tracking. Although power consumption is not an issue, the invention's power dissipation is many orders of magnitude below that of its digital predecessor. Also, the invention's frequency response is very fast compared with that of the photodiode sensor used in the digital system because the sensor array does not have to be read out prior to position computation. Since the invention's scanning circuitry is independent of the centroid computation, it can achieve bandwidths up to 40 kHz. For closed-loop systems, the mechanical positioning elements are the only limitations.

Figure 3:
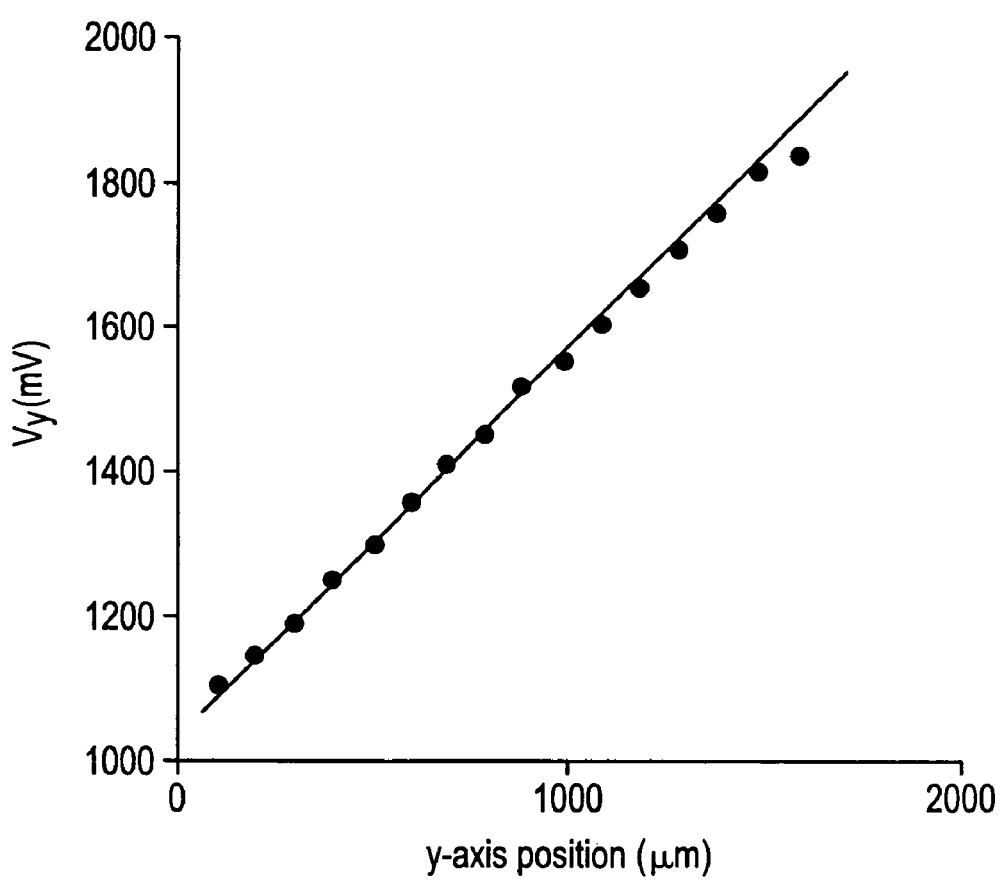
FIG. 3 is a plot of the invention position sensitivity of static inputs.

FIG. 3 shows a plot of the invention position sensitivity for static inputs. More specifically, FIG. 3 shows that the y-channel position sensitivity (output voltage) is a linear function of the position of a laser spot on the invention (the x-channel results are similar). (Data shown are for a 489-pW laser.) The bandwidth is dependent on illumination, as might be expected from FIG. 1.

Figure 4:
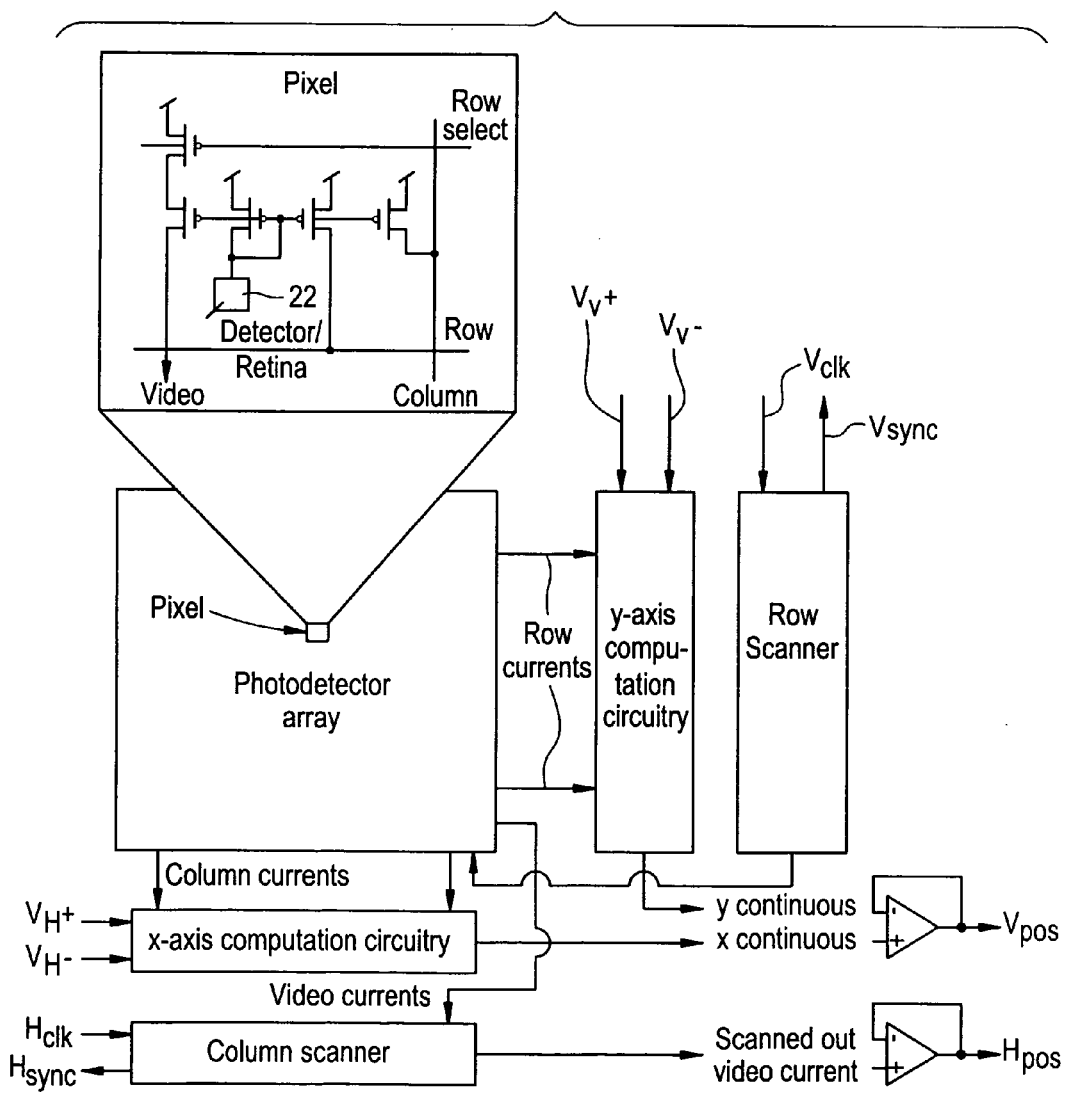
FIG. 4 is a block diagram of the retina video-centroid chip.
Figure 6:
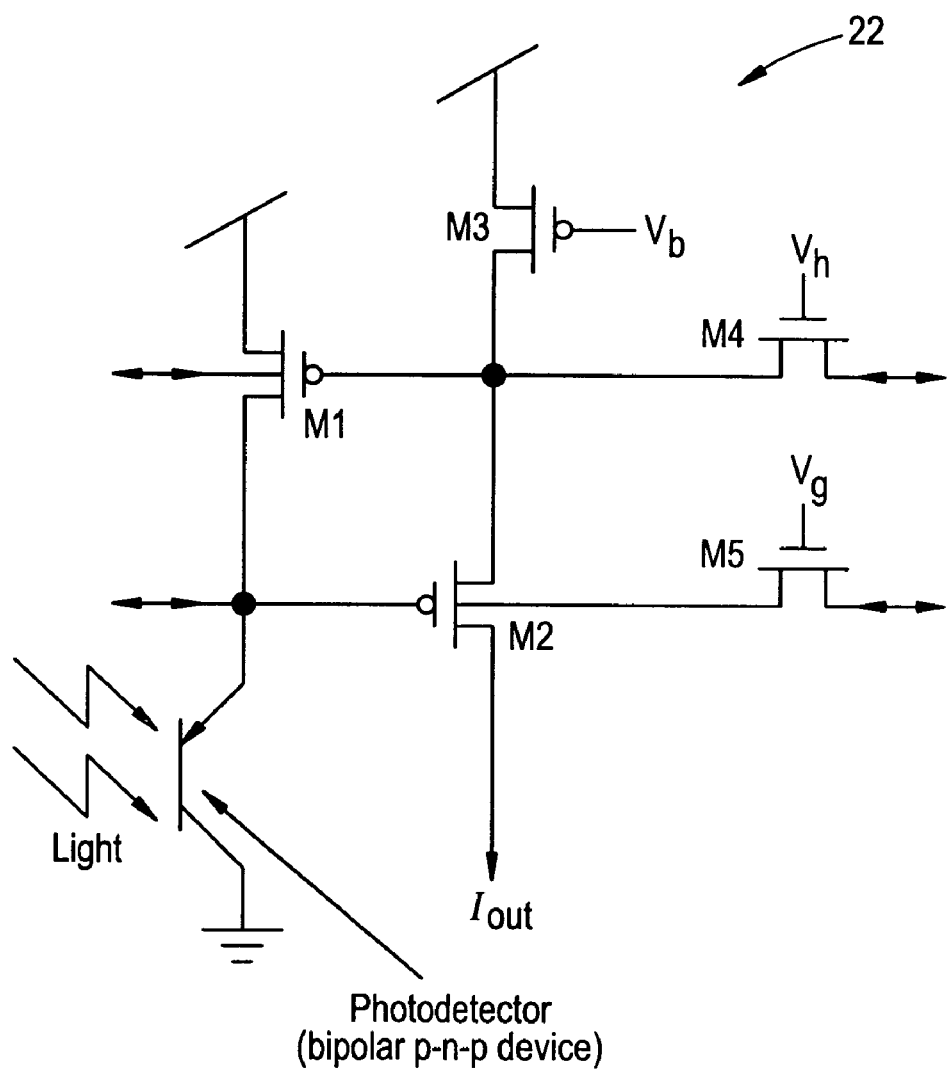
FIG. 6 illustrates a contrast sensitive two-layer silicon retina.

In a second embodiment of the invention (FIG. 4), each photodetector is replaced with a silicon retina 22 (retina details are shown in FIG. 6) (retina-VC chip or RVC chip) that provides continuous-time x and y signals and a scanned video signal. As shown in FIG. 4, current summing lines on each row and column enable each pixel to contribute to both the x and y centroids. Scanning circuitry reads out the photocurrent at each pixel. Global x and y computations, such as image centroid, are performed at the periphery. $V_{H+}$ and $V_{H-}$ are the voltages in the positive and negative horizontal directions; $V_{V+}$ and $V_{V-}$ are the voltages in the positive and negative vertical directions; $H_{clk}$ and $V_{clk}$ are the horizontal and vertical clocks; $H_{sync}$ and $V_{sync}$ are the horizontal and vertical synchronization pulses; and $H_{pos}$ and $V_{pos}$ are the horizontal and vertical position outputs.

Because the retina is contrast-sensitive, the invention's architecture could accommodate lower contrast images as well as scenes with illumination gradients. Scanner circuitry was also improved to enhance the speed and quality of the video readout. With these modifications, the size of the photodetector array could be increased while still maintaining a standard video output.

The centroid computation on the RVC chip was largely ineffective because the silicon retina enhanced the high-frequency portions of the image and removed the low-frequency information. As a result, the image became insensitive to the sort of aggregating centroid computation that is being performed. The problem was corrected by using a current-mode absolute value circuit (shown in FIG. 8) on the retina output prior to the centroid computation. The absolute value circuit effectively restores the low frequency information removed by the retina, allowing the centroid to be computed.

The RVC chip includes an on-chip video driver (not shown in FIG. 4), thereby reducing off-chip components to a single field-programmable gate array chip containing the video timing circuitry, a bipolar transistor, and fewer than 10 discrete resistors and potentiometers for biasing the chip. The entire centroid computation system, including on-chip and off-chip components, fits on a printed circuit board approximately 4 $in^2$, which is considerably more compact than an equivalent digital system.

The RVC chip's sensitivity was tested by using it to view star fields through an 11-in. Celestron telescope set at $f/10$. Stars of magnitude +3 were the dimmest objects which could be viewed reliably. (Fainter stars were obscured by nonuniformities in the retina resulting from the transistor mismatch discussed above.)

Since the RVC chip does not use an integrating detector, which builds up an image over time, it is much less sensitive than a CCD detector and is appropriate only for bandwidths greater than 1 kHz. However, converting the photodetector to an integrating detector is straightforward. Its sensitivity and fixed-pattern noise would then be similar to those of a CCD detector, but no readout would be required for the position estimate information. RVC chip attributes such as small size, low power dissipation, and simplicity extend the scope of potential applications even further.

One such application is as part of a solar attitude detector for microsatellites. Many proposed space missions depend on the use of "microsatellite" constellations to make simultaneous measurements at different orbital locations. Numerous new technologies are required to make the microsatellite concept viable from a mass and power standpoint. Digital solar attitude detectors (DSADs) are used extensively for spacecraft attitude. A micro-DSAD incorporating the entire sensor and its interface on a single chip creates a sensor small enough to have great utility in microsatellites for spacecraft formation flying as well as applicability in nearly all NASA spacecraft missions.

The position sensitive active pixel sensor also can serve as a housekeeping imager (digital camera) for spacecraft applications. This allows the same hardware to provide solar attitude, each limb position, as well as providing images of boom and antenna deployment, and so on.

Figure 9:
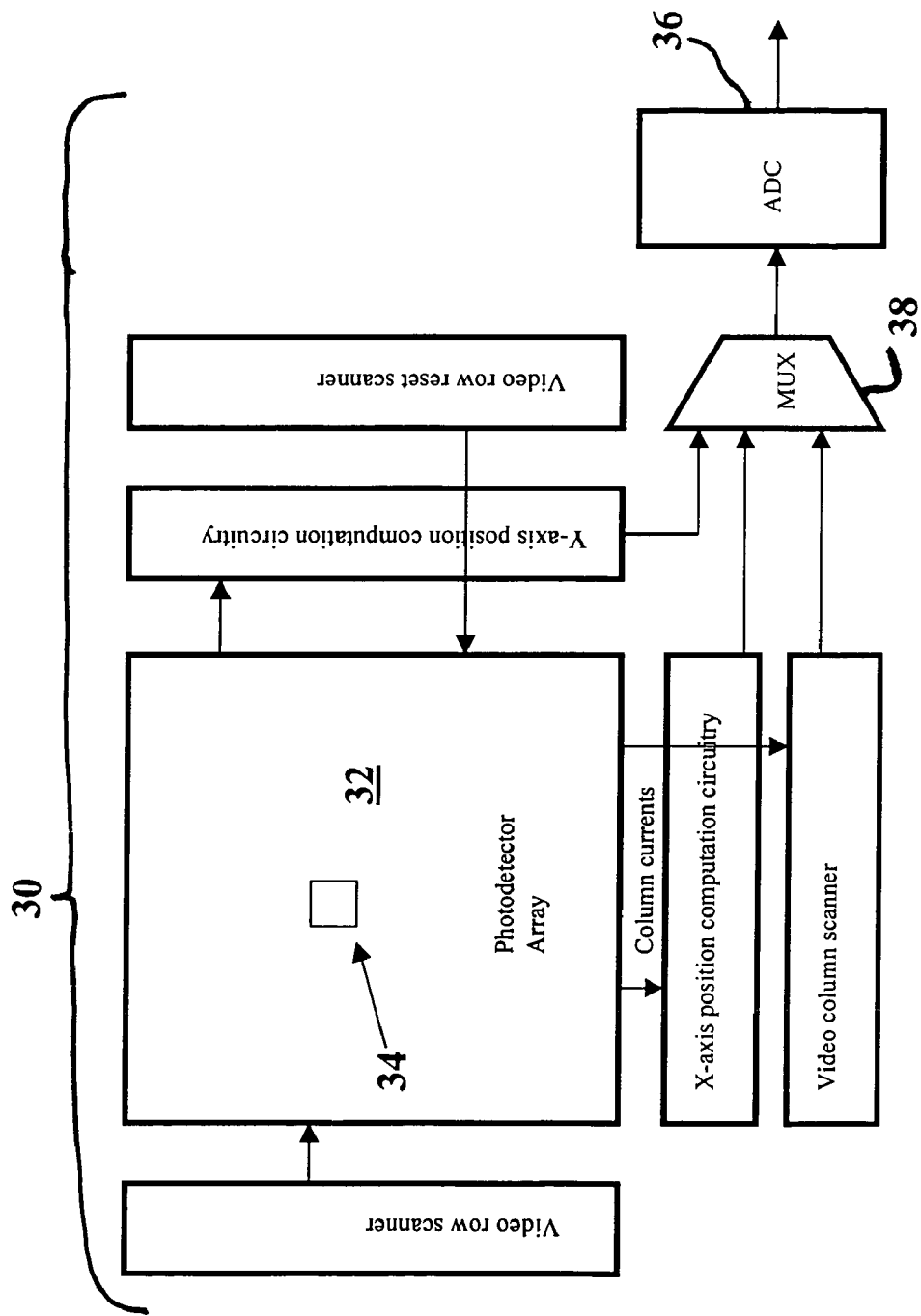
FIG. 9 illustrates the integrated circuit portion of a position sensitive active pixel sensor.
Figure 10B:
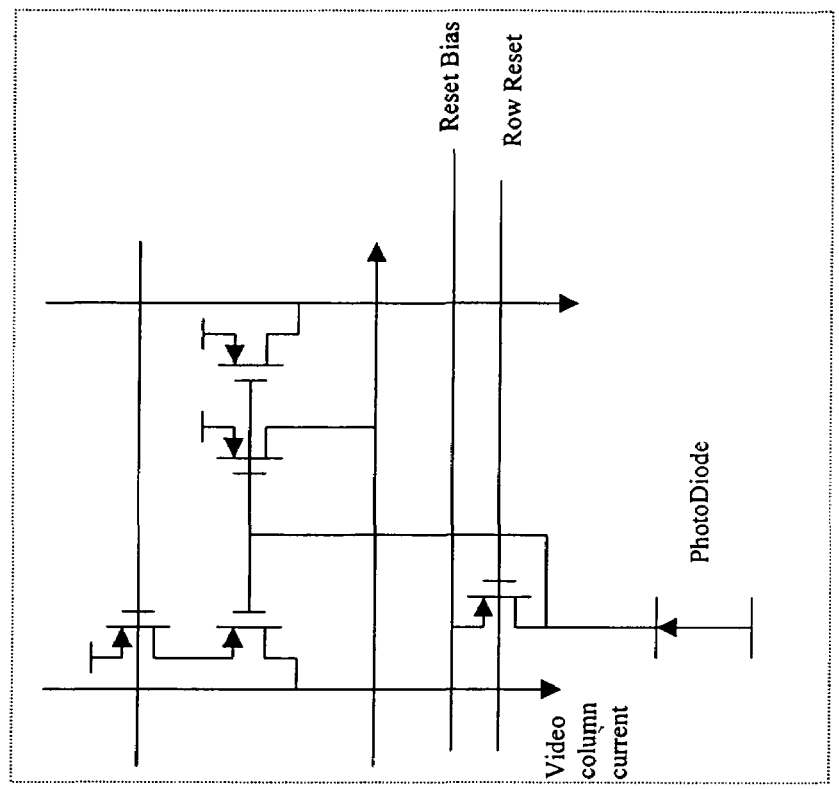
FIGS. 10a and 10b, illustrates, respectively, phototransistor and photodiode detectors for use in the photodetector array of FIG. 9.
Figure 10A:
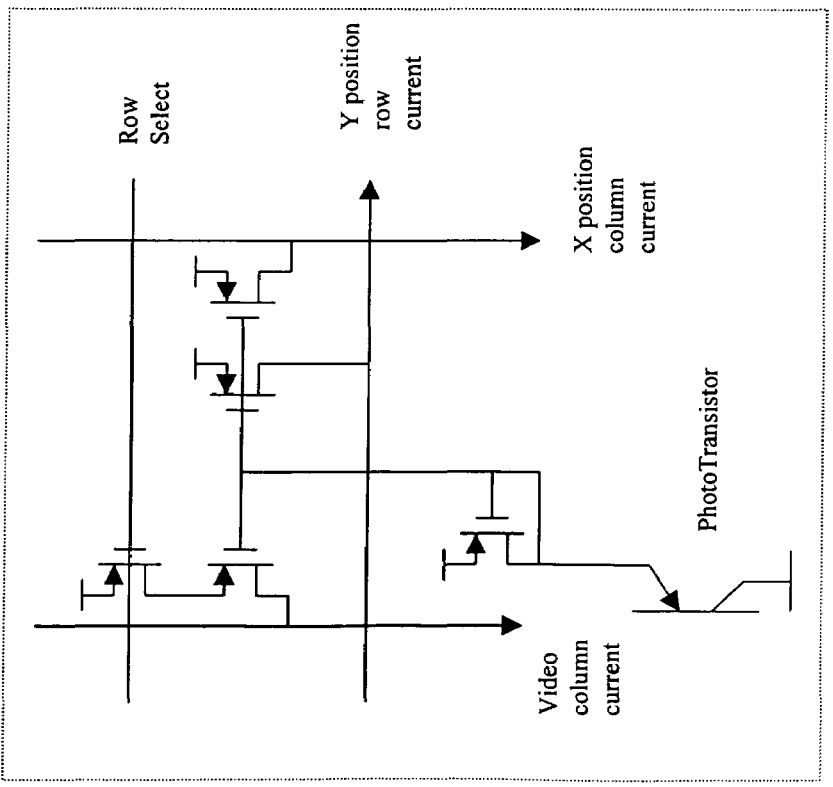

A two axis position sensitive active pixel sensor for use in a DSAD is shown in FIG. 9. The sensor comprises a standard wide angle lens system (not shown) and an integrated circuit 30. Sunlight, after traveling through the wide angle lens system, impinges on a photodetector array 32 which, in this embodiment, is a two axis position sensitive active pixel array. The pixels or detectors 34 comprising the array are not silicon retinas but rather silicon phototransistors or photodiodes (FIGS. 10a and 10b, respectively). In addition to the computation circuitry and scanners shown in FIG. 9, the sensor 30 also comprises an analog-to-digital converter 36 to provide digital output. A multiplier 38 is also provided for selecting, in turn, the scanned video image and row and column centroid signals to be digitized by the analog-to-digital converter.

Figure 11:
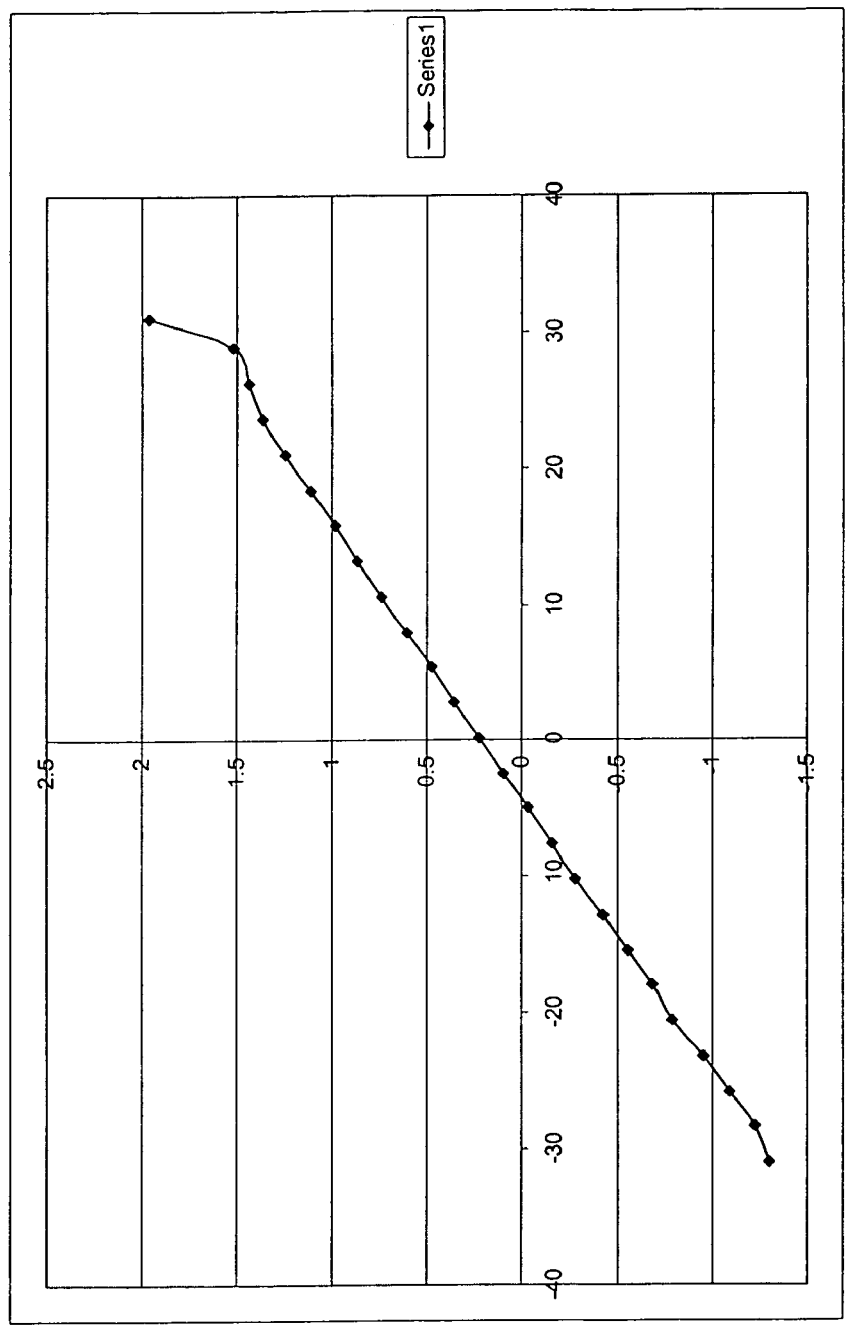
FIG. 11 is a plot of position in microsteps across an array in a prototype of the sensor shown in FIG. 9 vs. position response in volts.

The position sensitive active pixel sensor provides a two axis response, a 90 degree field of view and 0.1 degree resolution with ⅛ pixel resolution. The array size can easily be increased. The position response (volts) of a prototype sensor vs. position in microsteps across the array is shown in FIG. 11.

Figure 5:
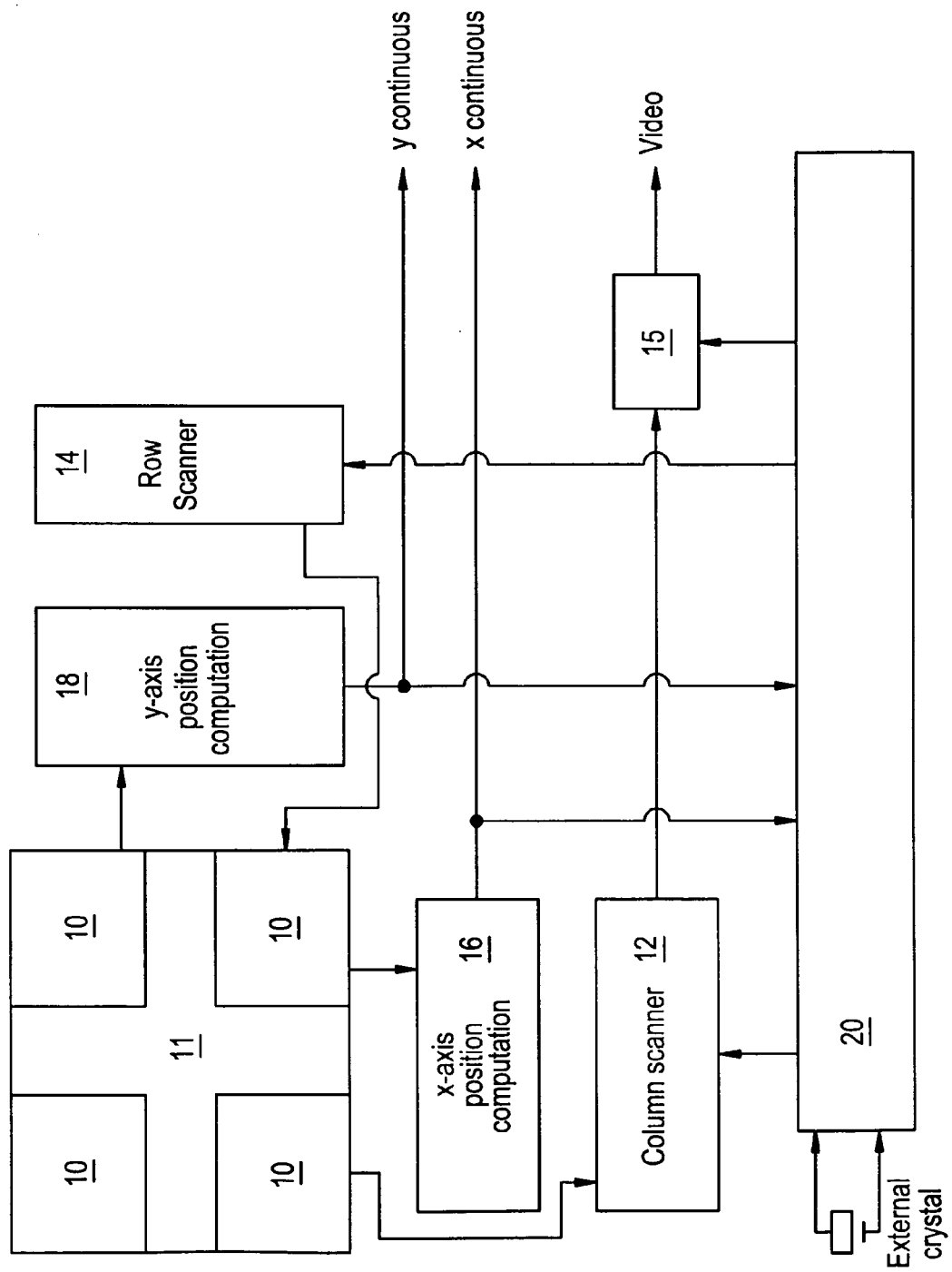
FIG. 5 is a block diagram of another embodiment of the invention.

FIG. 5 illustrates a further embodiment of the invention that includes a light sensitive array composed of four photodetector quadrant arrays 10 with a central cross-shaped, position-sensitive subarray 11. Each photodetector quadrant array is an image sensing array that could consist of photodiodes, charge-coupled devices, phototransistors or other light sensitive detectors. The quadrant arrays are scanned out (scanners 12, 14) to provide a video signal with an on-chip driver 15. The cross-shaped, position-sensitive subarray 11 consists of a biologically inspired, two layer silicon retina utilizing the same photodetectors as the photodetector quadrant arrays 10. The remaining elements of this embodiment are similar to those illustrated in FIG. 2.

As noted above, since finding the centroid is an averaging process, the solution is robust to noise, however, centroids are sensitive to illumination level and gradients. Image spatial filtering, for example, the nonlinear homomophic-like filtering provided by a contrast sensitive two-layer silicon retina, which removes low frequency spatial information, provides an output which is insensitive to illumination level and gradient. By its very nature, such filtering renders the centroid insensitive to image translation. This embodiment includes a novel type of position computation, called the absolute value centroid, which is compatible with image spatial filtering and remains sensitive to image translation of spatially filtered images.

FIG. 6 depicts a simplified, contrast sensitive, one-dimensional unit detector cell 22 of a two-layer silicon retina consisting of a photodetector, which in this case is a phototransistor, and five MOSFETs. (The phototransistor used in the retinal detector cell 22 of FIG. 6 could be replaced by the photodetector used in the quadrant arrays 10 (but not necessarily on the same pitch).) A bias voltage $V_b$ is input to the M3 transistor, which produces a base-level current in the system. M4 and M5, respectively, are smoothing networks for M1 and M2 and are biased by voltages $V_h$ and $V_g$. Light striking the photodetector produces an excitatory current that reduces the gate voltages on M2 and M1; M1, in turn, produces negative feedback by increasing the voltage on the gate of M2. The circuit output is the drain current of M2, which represents the processed input image.

Figure 7A:
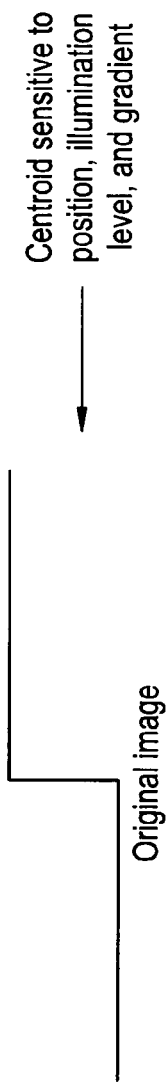
FIG. 7, consisting of FIGS. 7a, 7b and 7c, illustrates output of various devices.
Figure 7B:
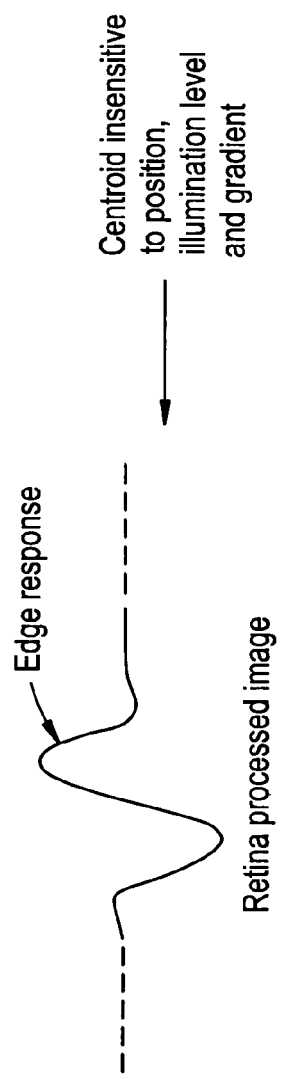

The novel position sensitive computation proceeds as follows. A contrast sensitive silicon retina such as that shown in FIG. 6 is employed in the cross subarray 11 to produce a high passed filtered, near optimal edge-enhanced image which is insensitive to illumination level and gradient. The output of this image is zero mean and is level shifted to a constant output bias as shown in FIG. 7b. (Note, FIG. 7a shows the output of quadrant arrays 10. ) A conventional centroid of the image in FIG. 7b would be insensitive to position.

Figure 7C:
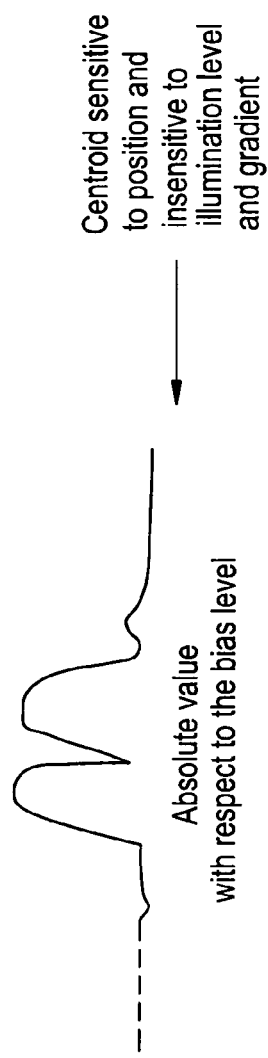

The novel computation is to perform a centroid computation on the absolute value of the retina image as shown in FIG. 7c. This effectively computes the centroid of the enhanced edges. Let b refer to the retina image bias level (set by M3 gate voltage $V_b$ in FIG. 6). We compute:

$$x_{position} = \Sigma x |r(x,y)-b|$$

$$y_{position} = \Sigma y |r(x,y)-b|$$

where r(x,y) denotes the retina image.

In the preferred embodiment, the vertical portions of the cross subarray 11 consist of contrast sensitive retinal pixels whose outputs are provided to the vertical y-axis position computation circuitry 18. Similarly, the horizontal portions of cross subarray 11 also consist of retinal pixels with outputs provided for the x-axis position computation circuitry 16. A cross subarray is preferred to minimize the combination of edge noise and to allow for the use of non-retinal (conventional) image sensing arrays in the quadrant portions 10. The "messy" pixels in the cross subarray can be accommodated in the same manner as bad rows and columns in commercial CCD cameras.

Figure 8:
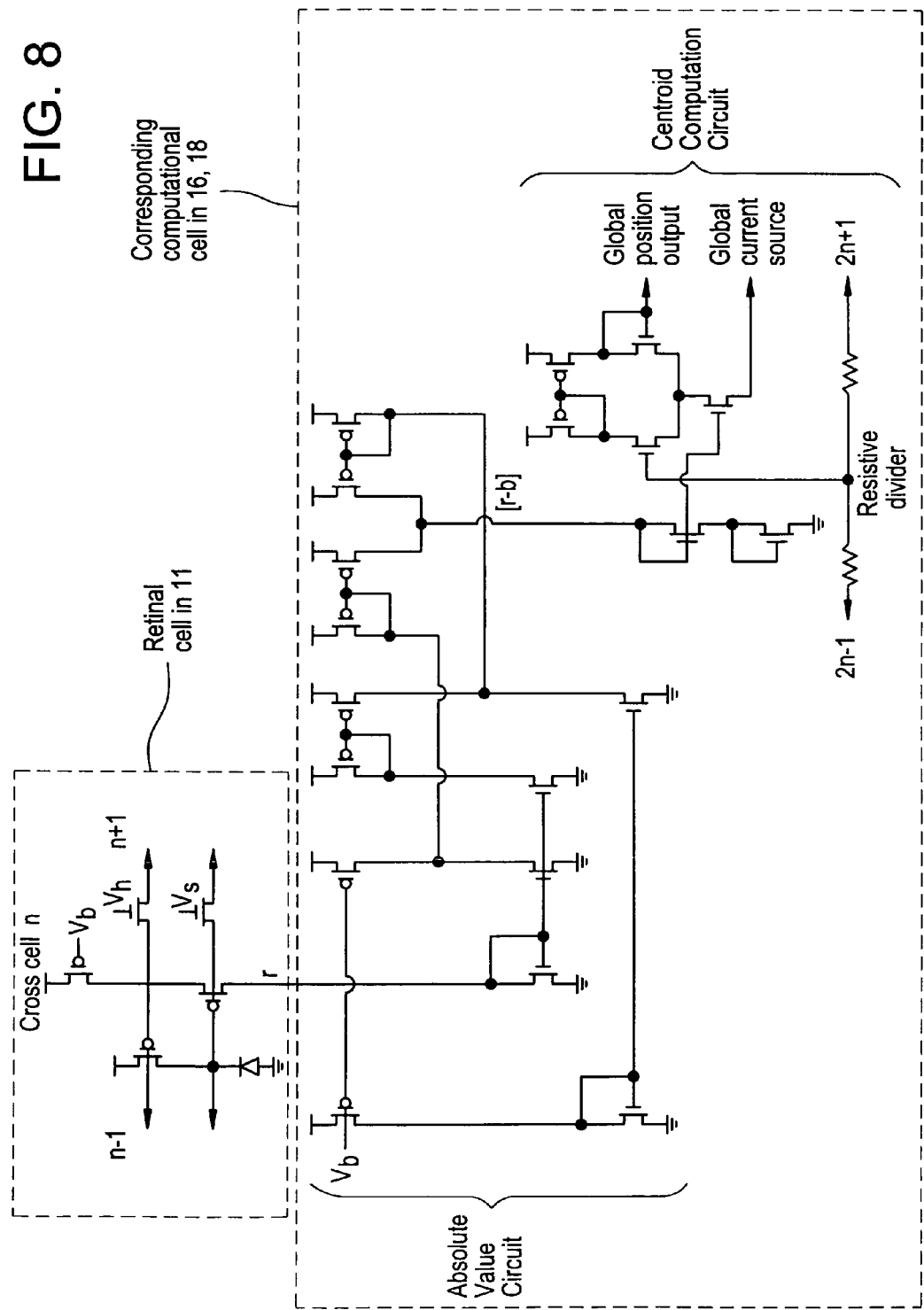
FIG. 8 illustrates a position sensing embodiment of the invention.

The position computation circuits consist of a linear array of computation cells, each of which corresponds to a retinal cell. This position sensing scheme is shown in FIG. 8 which also provides a schematic of a computation cell and corresponding retina cell. Each computation cell is comprised of an absolute value circuit and a centroid circuit of a type similar to that shown in FIG. 1. An absolute value circuit calculates |r-b| and a normalized centroid circuit globally computes x or y position as a voltage between two reference biases $V^+$ and $V^-$ on either end of the resistive divider. The global position voltages from 16 and 18 are digitized with the $\Sigma^{-\Delta}$ scheme to provide a position number in the range –p to +p where the number of total pixels in a row or column (including the "blank" area of the cross) is equal to 2p.

The sequencer 20 (FIG. 5) adjusts the scanning sequence of pixels such that the image appears as though the computed offsets x and y were zero. This can be accomplished with digital logic (not shown).

A centered video image on a single integrated circuit results in substantial improvements in ease of application, size, power, and weight. Immediate applications for this chip exist in video cameras, character and fingerprint identification, and astronomical imaging.

What is claimed is:
1. A single integrated circuit for providing a centered video imaging comprising:
   a light detector array comprising a plurality of detector cells arranged in rows and columns;

means for scanning out a photocurrent at each detector cell of the light detector array to provide a video image;

means for summing the photocurrent at the detector cells along each row and column in the light detector array;

means for computing row and column centroids of the video image using the output of the summing means; and a sequencing means for using the row and column centroids from the computing means and the video image from the scanning means to scan out the centered video images;

wherein the means for scanning is independent of the means for computing such that the light detector array does not have to be scanned out prior to computing row and column centroids, thereby increasing the frequency response of the circuit.

2. The single integrated circuit as recited in claim 1, wherein the light detector array comprises a photodetector array.

3. The single integrated circuit as recited in claim 2, wherein each detector cell comprises a silicon retina.

4. A position sensitive active pixel sensor comprising:
a wide angle lens system;
a photodetector array comprising a plurality of detector cells arranged in rows and columns;
means for scanning out a photocurrent at each detector cell of the light detector array to provide a video image;
means for summing the photocurrent at the detector cells along each row and column in the photodetector array; and
means for computing row and column centroids of the video image using the output of the summing means;
wherein the means for scanning is independent of the means for computing such that the photodetector array does not have to be scanned out prior to computing row and column centroids, thereby increasing the frequency response of the circuit.

5. The sensor as recited in claim 4, wherein each detector cell comprises a phototransistor.

6. The sensor as recited in claim 4, wherein each detector cell comprises a photodiode.

7. The sensor as recited in claim 4, further comprising an analog-to-digital converter for digitizing the scanned video image and the row and column centroid signals.

8. The sensor as recited in claim 7, further comprising a multiplexer for selecting, in turn, the scanned video image and row and column centroid signals to be digitized by the analog-to-digital converter.

9. An integrated circuit for use in a position sensitive active pixel sensor comprising:
a photodetector array comprising a plurality of detector cells arranged in rows and columns;
means for scanning out a photocurrent at each detector cell of the light detector array to provide a video image;
means for summing the photocurrent at the detector cells along each row and column in the photodetector array;
means for computing row and column centroids of the video image using the output of the summing means;
a multiplexer for selecting, in turn, the scanned video image and row and column centroid signals to be digitized; and
an analog-to-digital converter for digitizing the scanned video image and the row and column centroid signals;
wherein the means for scanning is independent of the means for computing such that the photodetector array does not have to be scanned out prior to computing row and column centroids, thereby increasing the frequency response to the circuit.

10. The integrated circuit as recited in claim 9, wherein each detector cell comprises a phototransistor.

11. The integrated circuit as recited in claim 9, wherein each detector cell comprises a photodiode.

* * * * *